(No Model.)
J. GIBBS.
HORSE SHOER'S BOX.
No. 333,213. Patented Dec. 29, 1885.
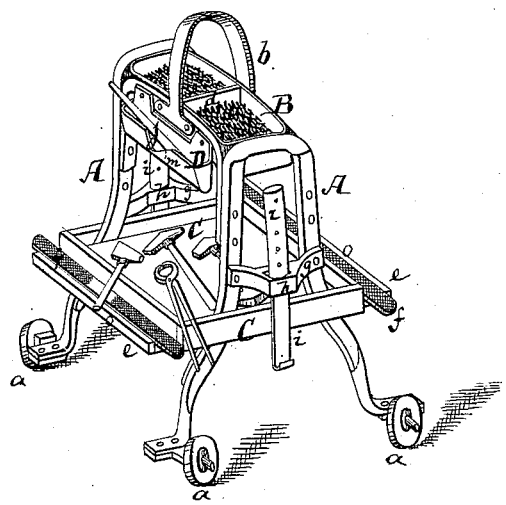
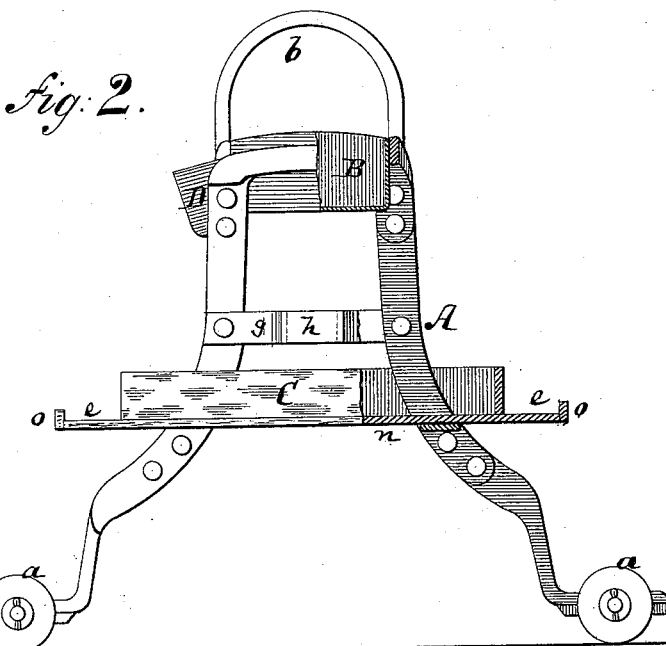
WITNESSES:
A. Schehl.
John M. Speer.
INVENTOR
John Gibbs
BY Briesen & Steele
ATTORNEYS

UNITED STATES PATENT OFFICE.

JOHN GIBBS, OF BROOKLYN, NEW YORK.

HORSESHOER'S BOX.

SPECIFICATION forming part of Letters Patent No. 333,213, dated December 29, 1885.

Application filed October 9, 1885. Serial No. 179,451. (No model.)

*To all whom it may concern:*

Be it known that I, JOHN GIBBS, a resident of Brooklyn, in the county of Kings and State of New York, have invented an Improved Horseshoer's Box, of which the following is a full, clear, and exact description, reference being made to the accompanying drawings, in which—

Figure 1 represents a perspective view of my improved horseshoer's box. Fig. 2 is a side elevation, partly in section, of the same.

This invention relates to improvements in the nail and tool boxes or holders which are used by horseshoers, and has for its object particularly to prevent the more costly tools from injury by contact with others, and also to give more convenient access to the tools.

The invention consists in the new combination of parts which make up the box, as hereinafter specified.

In the drawings, the letter A represents the frame of the horseshoer's box, said frame being mounted on rollers or casters $a$, to facilitate its transportation from place to place.
The upper part of this frame carries a bowed handle, $b$, by means of which the entire apparatus can be conveniently lifted and carried. The upper part of the frame A, directly below the handle $b$, contains a box or receptacle, B, for the horseshoe-nails. This receptacle is by preference divided by a partition, $d$, to permit the separation of different classes or kinds of nails. The lower part of the frame A carries a box, C, into which the ordinary tools of the horseshoer are to be put—such as the hammer, the pinchers, the buffer, the toe-knife, &c. At the sides of the box C are trough-like extensions $e\ e$, which are adapted to receive the rasps $f$. These rasps are among the most expensive tools used by the horseshoer, and are easily spoiled by being thrown in with other tools, for in this way the teeth of the rasp are bent out of shape, and its utility is therefore marred, hence these trough-like extensions $e$ on the box C are of great importance and considerable advantage.

At the sides of the frame A are cross-bars $g$, in which are formed loops $h$, for receiving the paring-knives $i$. These paring-knives are therefore also kept from contact with other tools and from injury thereby.

The stump-driver $j$, which is used to drive the old nails out of the hoof, is in my improved box received in a pocket, D, which is secured to the side of the box B, and which has a notch in the middle of its upright face, as at $m$, to permit the convenient grasping of the tool for the purpose of taking it out of the pocket.

It will be seen that with my improved box the more important tools—to wit, the rasp, the paring-knives, and the stump-drivers—are protected from injury and always in position for convenient access. The box itself can readily be transported from place to place, and has capacity for receiving all the tools that are used, or likely to be used, besides the nails, as stated.

Fig. 2 shows that the bottom plate, $n$, of the box C is extended outward beyond said box to form also the bottom of each of the troughs $e$, which are then completed by the upwardly-projecting ledges $o$.

I claim—

1. The horseshoer's box consisting of the frame A, bottom plate, $n$, forming the box C, and troughs $e$, of the nail-box B above the box C, pocket D at the side of the box B, and of the loop $h$ at the side of the frame A, all arranged substantially as herein shown and described.

2. The box C, having bottom plate, $n$, which is extended beyond the box to constitute the bottom of the trough $e$, as specified.

JOHN GIBBS.

Witnesses:
CHARLES G. M. THOMAS,
HARRY M. TURK.